United States Patent
Luo et al.

(10) Patent No.: US 8,826,421 B2
(45) Date of Patent: Sep. 2, 2014

(54) METHOD AND APPARATUS FOR SECURITY VALIDATION OF USER INPUT

(75) Inventors: Lin Luo, Beijing (CN); Fan Jing Meng, Beijing (CN); Shun Xiang Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 13/512,642

(22) PCT Filed: Nov. 5, 2010

(86) PCT No.: PCT/EP2010/066917
§ 371 (c)(1),
(2), (4) Date: Aug. 13, 2012

(87) PCT Pub. No.: WO2011/064081
PCT Pub. Date: Jun. 3, 2011

(65) Prior Publication Data
US 2012/0304249 A1 Nov. 29, 2012

(30) Foreign Application Priority Data
Nov. 30, 2009 (CN) .......................... 2009 1 0247132

(51) Int. Cl.
*G06F 21/00* (2013.01)
*G06F 21/55* (2013.01)
(52) U.S. Cl.
CPC .............. *G06F 21/00* (2013.01); *G06F 21/554* (2013.01)
USPC ............................... 726/21; 713/183; 709/225
(58) Field of Classification Search
CPC ..................................... G06F 21/554
USPC ........................................... 726/1
See application file for complete search history.

(56) References Cited

U.S. PATENT DOCUMENTS

| | | | |
|---|---|---|---|
| 6,341,359 B1 * | 1/2002 | Aiken et al. | ................... 714/100 |
| 6,374,254 B1 | 4/2002 | Cochran et al. | |

(Continued)

FOREIGN PATENT DOCUMENTS

| | | |
|---|---|---|
| CN | 101571858 | 11/2009 |
| WO | 2009042327 A2 | 4/2009 |

OTHER PUBLICATIONS

Clerc, D.; Garcés-Erice, L.; Rooney, S.; , "OS streaming deployment." Performance Computing and Communications Conference (IPCCC), 2010 IEEE 29th International , vol. no., pp. 169-179. Dec. 9-11, 2010.

(Continued)

*Primary Examiner* — Justin T Darrow
*Assistant Examiner* — Bryan Wright
(74) *Attorney, Agent, or Firm* — Trentice V. Bolar

(57) ABSTRACT

According to embodiments of the present invention, a computing device provides a security rules subset of a server-side protection element to a pre-validation component deployed at a client side. The computing device validates the user input based on the security rules. The computing device determines, in response to detecting a user input violation and that a violated security rule has/or has not been provided to the pre-validation component, the user as a first or second class of users. The computing device performs different security protection actions to the first and second class of users. The computing device asynchronously performs a dynamic update to the security rule subset provided to the pre-validation component. The security rule subset is screened from the security rules of the server-side protection means. A policy for screening the security rule subset is selected.

6 Claims, 4 Drawing Sheets

(56) References Cited

U.S. PATENT DOCUMENTS

| | | |
|---|---|---|
| 7,143,143 B1 | 11/2006 | Thompson |
| 7,225,460 B2 * | 5/2007 | Barzilai et al. .................... 726/1 |
| 7,398,382 B2 | 7/2008 | Rothman et al. |
| 7,853,783 B2 * | 12/2010 | Bin et al. ...................... 713/153 |
| 2005/0169282 A1 * | 8/2005 | Wittman ....................... 370/401 |
| 2007/0174873 A1 | 7/2007 | Griggs |
| 2008/0034425 A1 * | 2/2008 | Overcash et al. ............... 726/22 |
| 2009/0171903 A1 * | 7/2009 | Lin et al. .......................... 707/3 |
| 2009/0187713 A1 | 7/2009 | Zedlewski et al. |
| 2009/0199175 A1 | 8/2009 | Keller et al. |
| 2010/0306399 A1 | 12/2010 | Khosravi et al. |
| 2010/0325410 A1 | 12/2010 | Fitzgerald et al. |
| 2010/0333167 A1 * | 12/2010 | Luo et al. ......................... 726/1 |

OTHER PUBLICATIONS

Z. Xiao and F. Ye, New insights on internet streaming and iptv. In CIVR '08: Proceedings of the 2008 international conference on Content-based image and video retrieval, NY, USA, 2008 ACM.

* cited by examiner

METHOD AND APPARATUS FOR SECURITY VALIDATION OF USER INPUT

CROSS-REFERENCE TO RELATED APPLICATION

This is a U.S. National Phase application which claims priority from International Application PCT/EP2010/066917, filed Nov. 5, 2010, which in turn claims priority from Chinese Patent Application No. 200910247132.3, filed on Nov. 30, 2009. The entire contents of both of these applications are incorporated herein by reference.

TECHNICAL FIELD

The present invention relates to solutions for network security and, more specifically, to a method and apparatus for security validation of user inputs in network applications.

DESCRIPTION OF THE RELATED ART

Nowadays the number of security vulnerabilities in web applications is rapidly increasing. Network applications are susceptible to attacks including Cross-Site Scripting (XSS), SQL injection, LDAP injection, command access, PHP injection, etc. Statistics show that 75% of attacks are aimed at the application layer, and 90% of sites are vulnerable to network application attacks.

Among conventional solutions for Web application security, Web application review tool check code is used on the client side at one hand, and at the other hand, a Web application firewall is used on the Web application server side to filter and block malicious inputs. As malicious users might bypass the Web application view tool on the client side and directly inject malicious code or scripts to the Web application server, it is highly necessary to further validate users' inputs on the Web application server side.

The Web application firewall, a transparent protection mechanism applied on the Web application server side, is configured to at least have the following functions: validating users' inputs based on predefined security rules; taking proper security protection actions to users' inputs that violate security rules, e.g., blocking IP, denying request, generating log, or rewriting the payload, etc.

By observing online Web applications, it is found that validations of security rules as detected by server-side protection means may be induced from the following two circumstances:

1. Innocent users make a mistake in inputting some values that violate security rules;
2. Malicious users bypass the user input validation mechanism on the client side and inject malicious inputs to the Web application server by using some tools.

However, existing solutions for user input validation fail to effectively identify innocent users and malicious users, and protection means can hardly take proper, pertinent security protection actions. For example, if actions like blocking IP or rejecting request are taken to innocent users who simply make a mistake in inputting, a severe impact is then exerted on these users' experience of the Web application; if requests from users, regardless of malicious users or innocent users, are rejected during violation and a security hint is provided in a user-friendly manner, then performance consumption of security validation systems will be increased significantly.

Therefore, there is a need for a security validation scheme for network applications, which can effectively identify innocent users and malicious users.

SUMMARY OF THE INVENTION

To eliminate defects in the prior art, the present invention puts forward a method for security validation of a user input in a network application. The method comprises: providing a security rule subset of security rules of server-side protection means to a pre-validation component deployed at a client, so as to enable security validation of a user input on the client side by the pre-validation component based on the provided security rule subset; validating the user input based on a security rule of the protection means; determining, in response to detection of a violation user input and that a violated security rule has not been provided to the pre-validation component, the user as one of a first class of users; and determining, in response to detection of a violation user input and that a violated security rule has been provided to the pre-validation component, the user as one of a second class of users.

Preferably, the present invention provides a method further comprising: asynchronously performing a dynamic update to a security rule subset provided to the pre-validation component; wherein a security rule subset is screened from a security rule set of the protection means in the step of providing the security rule subset of security rules of the server-side protection means to the pre-validation component and in the step of asynchronously performing a dynamic update to the security rule subset provided to the pre-validation component.

Preferably, the present invention provides a method wherein the pre-validation component is a stand-alone Javascript component capable of running on a client browser.

Preferably, the present invention provides a method further comprising: performing different security protection actions to the determined first class of users and second class of users.

Preferably, the present invention provides a method wherein the step of performing different security protection actions to the determined first class of users and second class of users comprises: performing, to the second class of users, a security protection action as compulsorily blocking all subsequent requests; and performing, to the first class of users, a security protection action which helps to maintain their good experience.

Preferably, the present invention provides a method wherein the policy comprises one or more of the following: selecting a security rule having a high violation ratio; excluding all negative rules in the security rule set; excluding high-risk security rules in the security rule set.

Preferably, the present invention provides a method wherein in response to an onPropertyChange event in an input field, the pre-validation component validates security of a user input on the client side based on the provided security rule subset.

The present invention further puts forward an apparatus for security validation of a user input in a network application. The apparatus comprises: means for providing a security rule subset of security rules of server-side protection means to a pre-validation component deployed at a client, so as to enable security validation of a user input on the client side by the pre-validation component based on the provided security rule subset; means for validating the user input based on a security rule of the protection means; means for determining, in response to detection of a violation user input and that a violated security rule has not been provided to the pre-validation component, the user as one of a first class of users; and means for determining, in response to detection of a violation user input and that a violated security rule has been provided to the pre-validation component, the user as one of a second class of users.

Preferably, the present invention provides an apparatus further comprising: means for asynchronously performing a dynamic update to a security rule subset provided to the pre-validation component; wherein the means for providing a security rule subset of security rules of server-side protection means to a pre-validation component at a client, so as to enable security validation of a user input on the client side by the pre-validation component based on the provided security rule subset and the means for asynchronously performing a dynamic update to a security rule subset provided to the pre-validation component screen the security rule subset from a security rule set of the protection means according to a certain policy.

Preferably, the present invention provides an apparatus wherein the pre-validation component is a stand-alone Javascript component capable of running on a client browser.

Preferably, the present invention provides an apparatus further comprising: means for performing different security protection actions to the determined first class of users and second class of users.

Preferably, the present invention provides an apparatus wherein the means for performing different security protection actions to the determined first class of users and second class of users comprises: means for performing, to the second class of users, a security protection action as compulsorily blocking all subsequent requests; and means for performing, to the first class of users, a security protection action, which helps to maintain their good experience.

Preferably, the present invention provides an apparatus wherein the policy comprises one or more of the following: selecting a security rule having a high violation ratio; excluding all negative rules in the security rule set; excluding high-risk security rules in the security rule set.

Preferably, the present invention provides an apparatus wherein in response to an onPropertyChange event in an input field, the pre-validation component validates security of a user input on the client side based on the provided security rule subset.

The present invention still further relates to a security validation system that comprises an apparatus for security validation of a user input in a network application.

According to the technical solution of the present invention, it is possible to effectively differentiate between "a second class of users" and "a first class of users." Different solutions may be configured for a second class of users and a first class of users, whereby pertinence of the validation process is enhanced. According to an embodiment of the present invention, it is possible to ensure use experience of Web application for "a first class of users" as much as possible and avoid meaningless system performance consumption to a maximum extent. In addition, the workload for the server-side protection means is reduced, and performance of the entire validation system is increased accordingly.

BRIEF DESCRIPTION OF THE DRAWINGS

As the present invention is better understood, other objects and effects of the present invention will become more apparent and more comprehensible from the following description, when taken in conjunction with the figures wherein.

Like numerals represent the same, similar or corresponding features or functions throughout the foregoing figures.

DETAILED DESCRIPTION OF THE PREFERRED EMBODIMENT

Figure 1:
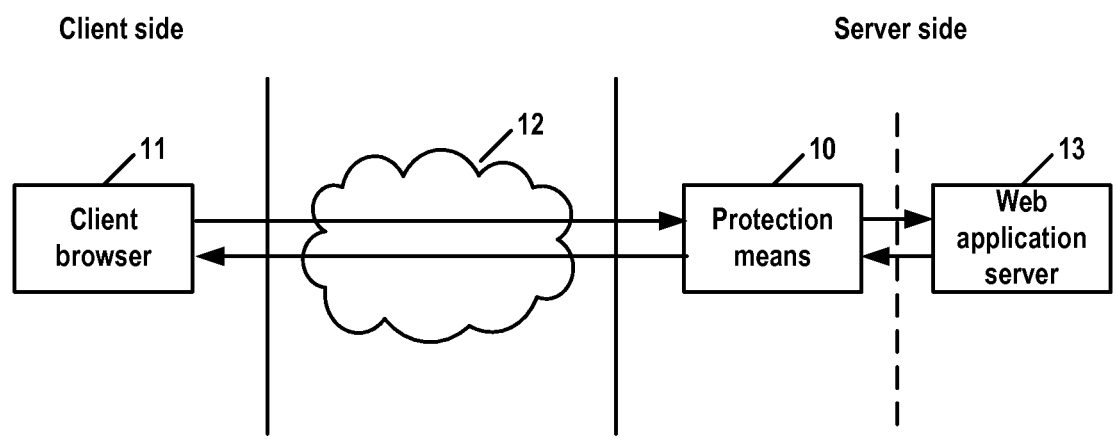
FIG. 1 schematically illustrates a system structure in which an embodiment of the present invention may be implemented.

FIG. 1 schematically illustrates a system structure in which an embodiment of the present invention may be implemented. Reference numeral 11 represents a client browser on the client side, for sending a user's HTTP request to and receiving a corresponding response from a Web application server; 12 represents a network, via which the Web application server can respond to the request sent by the user through the client browser; 10 represents protection means on the Web application server side, for validating an input value in the user request on the server side and providing security protection for the Web application server; 13 represents the Web application server.

As illustrated in FIG. 1, the user sends a request with an input value to the Web application server 13 via the network 12 by the client browser 11 on the client side. It is necessary to validate the user's input value so as to guarantee security of the Web application. Normal users will not key in a malicious value, such as logic code (e.g., JavaScript logic), on the client side, whereas potential malicious users may inject malicious logic code to the Web application server 13 for purposes of attacking the server, stealing private information of other users, etc., which malicious code like JavaScript will steal sensitive information of clients when sent to the client's browser by the server. Although a Web application review tool (not illustrated) may be configured on the client side to detect users' input values, malicious users may bypass the Web application review tool by using some tools, to directly inject a malicious value to the Web application server 13 with a scripting injection tool. Hence, the protection means 10 like an application firewall on the server side should be configured with predefined security rules, based on which the protection means 10 validates users' input values. When the protection means 10 detects a user input value that violates the security rules, it takes proper security protection measures to this user so as to remove a potential hidden peril. Table 1 shows exemplary security rules which the protection means 10 might adopt.

TABLE 1

| | |
|---|---|
| application-specific rule | ALLOWRULE "URI /testresult.html; name ^[a-zA-Z0-9\s.\-] * $ ; age ^[ 0-9]+$"; "ID=050000,SEVERITY=2, ATTACKTYPE=malformed, ACTION=deny " |
| negative rule | NEGATIVERULE " ALL *(?:\b(?:\.(?:ht(?:access\|passwd\|group)\|www?acl)\| global\.asa\|httpd\.conf\|boot\.ini)\|b\\/etc\/).*" "ID=090001, SEVERITY=1, ATTACKTYPE=File Injection, ACTION=block" |
| Aliases | Regex |

TABLE 1-continued

| | |
|---|---|
| safe text | ^[a-zA-Z0-9\s.\-]*$ |
| email | [\w-]+(?:\.[\w-]+)*@(?:[\w-]+\.)+[a-zA-Z]{2,7}$ |
| integer | (-\|\+)?[0-9]+ |
| XSS inject | /((\%3C)\|<)((\%2F)\|\/)*[a-z0-9\%]+((\%3E)\|>)/ix |
| SQL inject | /\w*((\%27)\|(\'))((\%6F)\|o\|(\%4F))((\%72)\|r\|(\%52))/ix |

The example of security rules as shown in Table 1 comprises an application-specific rule and a negative rule. The application-specific rule stipulates security rule information on various input fields as determined by a specific application, such as information on user input values as allowed in fields representing "name" and "age." For example, input values allowed by "name" are defined by a regular expression of "safe text"; input values allowed by "age" are defined by a regular expression of "integer." The application-specific rule further stipulates that an attack type violating this rule is "MALFORMED" and a security protection action to be taken is "deny." The negative rule stipulates negative values of user inputs, i.e., negating all user input values of all regular expressions conforming to "XSS (Cross-Site Scripting)." The negative rule further stipulates that an attack type violating this rule is "XSS (Cross-Site Scripting)" and a security protection action to be taken is "deny."

Although Table 1 shows an example of security rules configured in the protection means 10, security rules in the protection means 10 may comprise other forms. In fact, those skilled in the art may understand, from the description to be given below, that specific forms and content of security rules do not limit the present invention.

In security validation schemes provided for Web applications, efforts should be taken to prevent the protection means 10 from performing security protection actions, such as blocking IP and rejecting request which will severely affect user experience of Web applications, to innocent users who makes a mistake in inputting values violating a predefined security policy, simply based on the security policy; further, efforts should be taken to prevent the protection means 10 to performing security protection actions, such as sending a user-friendly security hint and even rewriting the payload which will increase consumption of the system performance, to innocent users who inject malicious code. In a security validation scheme according to the present invention, the protection means 10 can effectively differentiate classes of users who violate security rules, so that it can take proper, pertinent security protection actions to violator users, i.e. guaranteeing user experience of a first class of users (who tend to be determined as innocent users) without wasting the precious system performance for a second class of users (who tend to be determined as malicious users).

It should be noted that the first class of users tends to correct violation inputs according to the security hint provided by the system until user input values conform to security rules; however, the second class of users intends to inject malicious values to the Web application server 13 and its inputs will not conform to security rules through user-friendly interactions in the validation process. Hence, the present invention puts forward such a design that the protection means 10 deploys a pre-validation component on the client browser 11 and the pre-validation component is caused to pre-validate user inputs on the client side according to some security rules provided by the protection means 10. The protection means 10 validates the user input according to the predefined security rules and determines whether the user belongs to the first class of users or the second class of users according to the pre-validation on the client side and the validation performed by itself, and a security protection action to be taken is selected based thereon.

Figure 2:
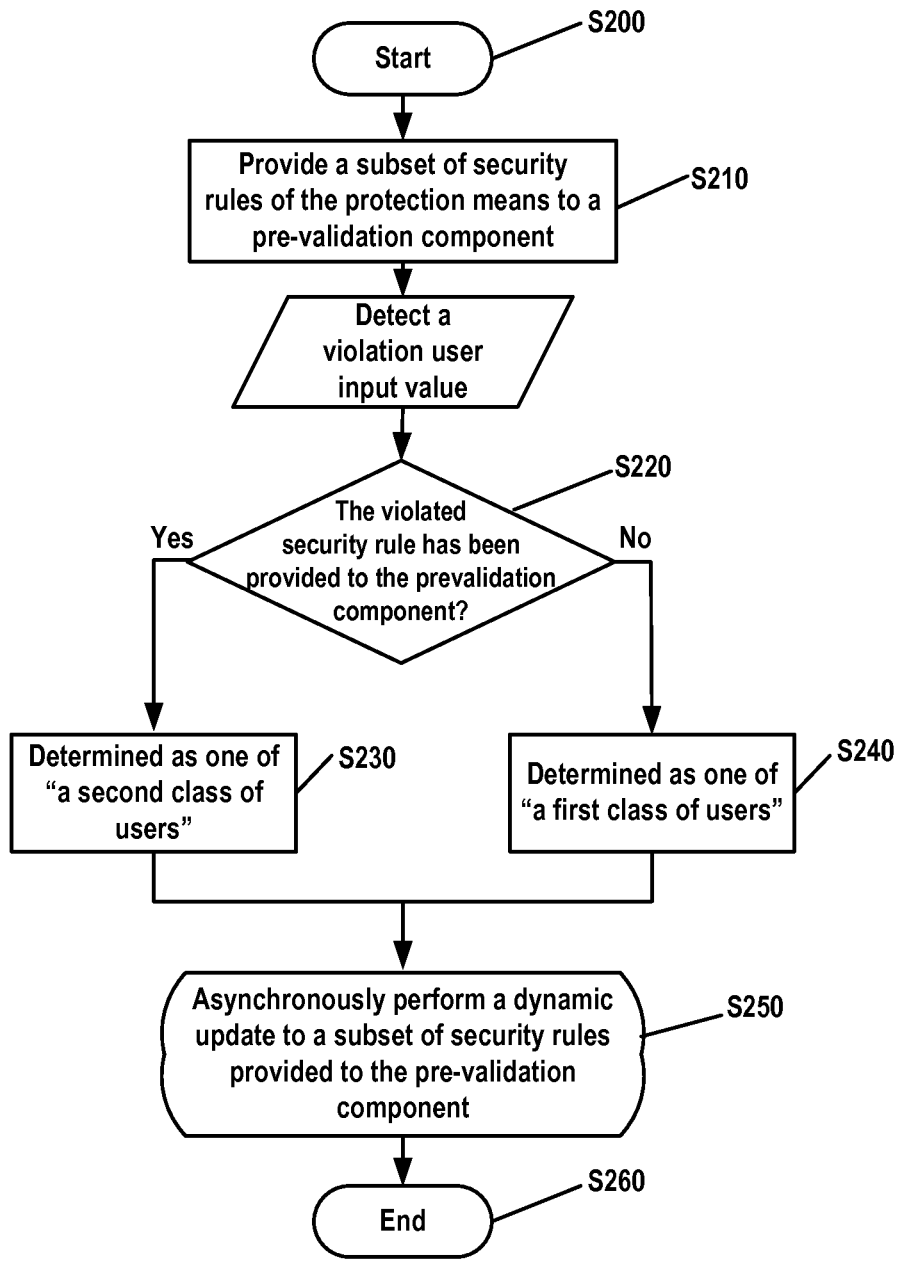
FIG. 2 illustrates a flowchart of a method for security validation of a user input according to an embodiment of the present invention.

FIG. 2 illustrates a flowchart of a method for security validation of a user input according to an embodiment of the present invention.

The method starts in step S200.

In step S210, a subset of security rules in the protection means on the server side is provided to the pre-validation component deployed on the client, so that the pre-validation component validates security of a user input value on the client side based on the provided subset of security rules.

The pre-validation component on the client may be deployed on the client by the protection means or may be obtained from the protection means via the network by a client plug-in. For example, the pre-validation component may be a stand-alone Javascript component. In one implementation, the protection means inserts the Javascript pre-validation component into an application responding page, so that the pre-validation component is run by the client browser.

Security rules provided by the protection means to the client-side pre-validation component are preferably a proper subset of security rules in the protection means. A security policy file indicating security rules may be provided to the pre-validation component. The security policy file may comprise, in brief, an alias (e.g., email, URL, safe text, XSS, etc.), a field name, URI monitored by the pre-validation component on the client side, so long as regular expressions defined in the client-side pre-validation component are compatible with regular expressions defined in the server-side protection means.

In step S220, when a violation user input value is detected, it is determined whether the violated security rule has been provided to the client-side pre-validation component.

If it is determined in step S220 that the violated security rule has been provided to the client-side pre-validation component, this means that the server-side protection means has detected the security problem which should have been solved by the pre-validation module on the client side, the violator user directly injects a malicious value into the Web application after bypassing the client-side pre-validation mechanism by means of an attaching tool, for example. Hence, the violator is determined as one of "a second class of users" in step S230. The second class of users tends to determined as malicious users.

On the other hand, if it is determined in step S220 that the violated security rule has not been provided to the client-side pre-validation component, then in step S240 the violator user is determined as one of "a first class of users." The first class of users tends to be determined as innocent users.

Preferably, a subset of security rules which is provided to the pre-validation component is updated asynchronously in step S250. To perform the update "asynchronously" means that the update step is performed independently relative to the entire validation process. For example, in one implementation the update process may be implemented using the AJAX (Asynchronous JavaScript and XML) technique in the background. This update step may be performed either periodically or irregularly, wherein the protection means screens a security rule subset, which is to be provided to the pre-validation component, out of the overall security rule set according to a certain policy. The protection means may rank each security rule according to a violation ratio according to statistics of the security validation log and screen security rules with high violation ratios to be provided to the client-side pre-validation component. For example, it may be further noted that the second class of users might obtain information on security rules in the pre-validation component by analyzing responses (e.g., various security hints, etc.) of the client-side pre-validation component to input values, so a security rule subset for the pre-validation component is screened with reservations for some specific rules. In a preferred embodiment, the screened security rule subset may satisfy one or more of the following conditions:
1. selecting security rules each having a high violation ratio;
2. excluding all negative rules in the security rule set;
3. excluding high-risk security rules, i.e., rules that will pose a serious threat to the system security once violated.

By dynamically updating the security rule subset for the client-side pre-validation component, the range of security rules the pre-validation mechanism might cover is enlarged, and it is difficult for the second class of users to obtain information on security rules by trying inputs because the update action and the updated content completely depend on the server-side protection means. In this manner, the pre-validation accuracy and the system security is increased.

The method ends in step S260.

Since the technical solution according to the present invention can effectively differentiate classes of users, the protection means may be configured to perform different security protection actions with respect to "a first class of users" and "a second class of users" being determined. To "the second class of users" that tend to be determined as "malicious users," for example, it is possible to take such a security protection action as compulsorily blocking all of their subsequent input requests, such as blocking IP; to "the first class of users" that tend to be determined as "innocent users," a security protection action that helps to maintain their good experience is taken, for example, rejecting requests and sending a user-friendly security hint and/or rewriting the payload.

Hereinafter, the technical solution according to the present invention will be described in more detail by way of an example that shows workflows of and interactions between components on the server side and on the client side.

Figure 3:
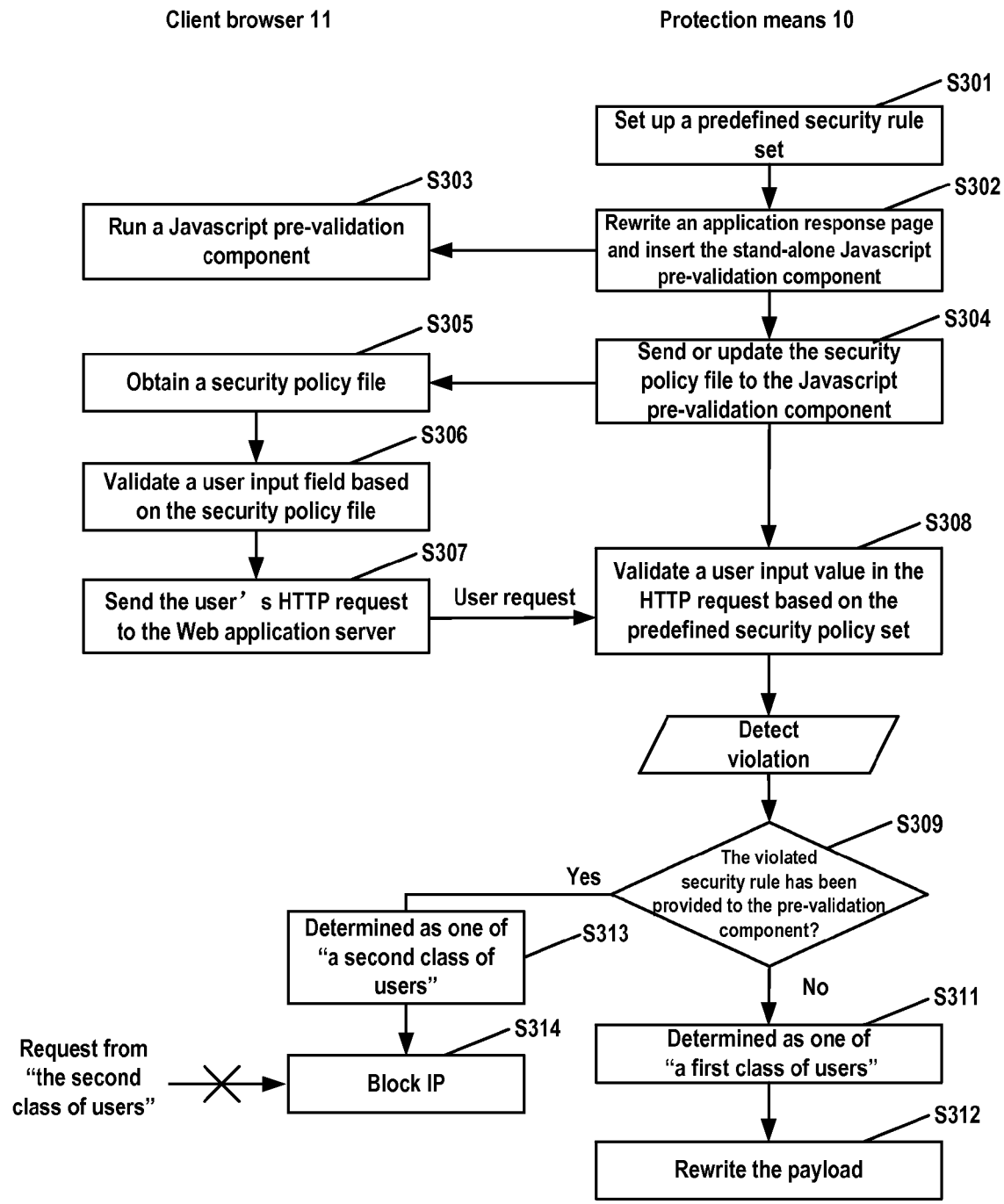
FIG. 3 illustrates a workflow chart of server-side protection means and a client-side pre-validation component according to an embodiment of the present invention.

FIG. 3 illustrates a workflow chart of the server-side protection means and the client-side pre-validation component according to an embodiment of the present invention.

As illustrated in FIG. 3, in step S301 a set of predefined security rules is set up in the protection means 10. The set of security rules may comprise application-specific rules and negative rules. It is to be understood that this step is performed asynchronously with the user input process and is usually performed while the protection means 10 is being deployed.

In step S302, the protection means 10 rewrites the application response page so as to insert a stand-alone Javascript pre-validation component into the application response page. According to one implementation of the present invention, the Javascript pre-validation component may be implemented by code in Table 2.

TABLE 2

Code example for the Javascript pre-validation component inserted by the protection means

```
var element=document.createElement('script');
element.setAttribute ('src','http://aspis.crl.abc.com/js/WAF_monitor.js');
document.body.appendChild(element);
```

In step S303, the Javascript pre-validation component is run in the client browser 11.

The Javascript pre-validation component adds a monitor for onPropertyChange events to each user input field in the page, so as to activate the pre-validation process for a user input by monitoring an onPropertyChange event in a user input field. The Javascript pre-validation component further provides means for obtaining a security policy file from the protection means 10, wherein the security policy file represents a rule subset of security rules in the protection means 10.

TABLE 3

Code example for adding monitor for onPropertyChange event

```
var inputs = document.getElementsByTagName("input");
for( var i=0; i<inputs.length; i++){
    if( inputs[i].type=="text" )
        inputs[i].attachEvent("onPropertyChange",validation);
}
```

In step S304, the protection means 10 updates or sends the security policy file to the Javascript pre-validation component in the client browser 11. The security rule subset contained in the security policy file is screened from the overall security rule set in the protection means 10 according to statistics of violation logs detected by the protection means 10. The security policy file may comprise a list of input fields and corresponding patterns with a high violation ratio.

In step S305, the Javascript pre-validation component obtains the security policy file from the server-side protection means 10, in the client browser 11.

In step S306, the Javascript pre-validation component validates a user input field based on a security rule in the security policy file in response to an onPropertyChange event in the input field, in the client browser 11. In one implementation, the function of enabling the pre-validation may be implemented by code in Table 4.

TABLE 4

Code example of Enabling the Pre-validation based on the policy file obtained from the protection means

```
function validaion( ) {
    var event = window.event.srcElement;
    //The security policy file here defines which input fields need
to be validated, which pattern is used
    // The security policy file can be retrieved from teh server-side
protection means periodically or irregularly
    // by using Web page development techniques creating interactive
Web page applications, e.g., AJAX (Asynchronous JavaScript and XML)
    if( violate the security policy file){
        document.getElementById("errorMsg").innerText =
"Error Info is Here";
    }
    else {
        document.getElementById("errorMsg").innerText = "";
    }
}
```

When the violation of a user input value is detected, a friendly hint is provided to the user, for example, giving an example of correct input values and indicating the problem in the current input value, so that the user can complete a correct input to the input field according to the hint.

In step S307, the client browser 11 sends the user's HTTP request to the server-side protection means 10. It should be noted that since the Javascript pre-validation component might validate only part of input fields or part of security rules based on the security policy file, not all of the user's input values are pre-validated by the Javascript pre-validation component. In other words, the user's HTTP request sent by the client browser 11 to the protection means 10 might comprise pre-validated user input values or user input values which are not yet pre-validated. It is to be understood that pre-validated user input values conform to security rules, whereas user input values which are not yet pre-validated may possibly violate security rules.

In view of this, the server-side protection means 10 validates all user input values contained in the HTTP request based on the predefined security policy set in step S308.

In step S309, it is determined, when violation is detected, whether the violated security rule has been updated to the client-side Javascript pre-validation component.

When the protection means 10 detects violation, if the violated security rule has not been updated to the client-side Javascript pre-validation component, the corresponding user is determined as one of "the first class of users" in step S311. The first class of users tends to be determined as innocent users.

In step S312, a security protection action that helps to maintain the user's good experience is taken to the determined "first class of users", for example, reconfiguring the request (Rewrite Request) and sending the request to the application server. The first class of users tends to be determined as innocent users.

When the protection means 10 detects violation, if the violated security rule has been updated to the client-side Javascript pre-validation component, the corresponding user is determined as one of "the second class of users" in step S313. It is because that the user directly injects a malicious value, which violates the security rule, to the application server after bypassing the pre-validation mechanism in the client browser using a tool.

In step S314, a security protection action that compulsorily blocks all sequent requests is taken to the determined "second class of users", for example, blocking IP.

Those skilled in the art would appreciate that for different Web applications, different security protection actions might be taken to "the second class of users" or "first class of users" as determined. They may set security protection actions at different rating or with different features in accordance with concrete application requirements and assign these security protection actions to the determined "second class of users" or "first class of users".

It should be explained that although the Javascript pre-validation component is used as an example to describe a specific embodiment of the present invention in FIG. 3, any other code language that is compatible with Web applications can be used for implementing the pre-validation component, such as VBscript. Moreover, those skilled in the art may deploy the pre-validation component at the client in any known manner. A further implementation may comprise, for example, providing a specific plug-in at the client so as to obtain the pre-validation component actively. Therefore, concrete implementations of the pre-validation component do not limit the present invention.

Figure 4:
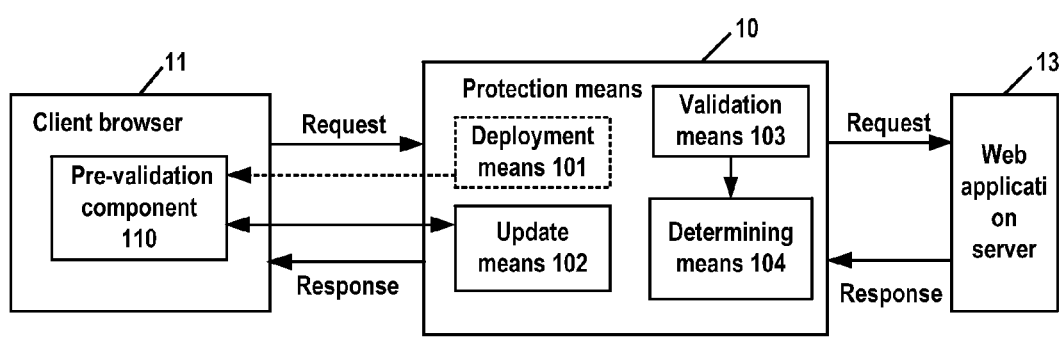
FIG. 4 schematically illustrates a view of interactions between modules of a security validation system according to an embodiment of the present invention.

FIG. 4 schematically illustrates a functional block diagram of a security validation system according to an embodiment of the present invention.

As illustrated in FIG. 4, the client browser 11 sends an HTTP request to the Web application server 13 and obtains a corresponding response from the Web application server 13. The server-side protection means 10 performs input validation to the request from the user based on the predefined security rule set, so as to guarantee security of the Web application server 13.

The protection means 10 comprises: optional deployment means 101 for deploying a pre-validation component at a client browser; update means 102 for providing or updating a subset of security rules to a client-side pre-validation component; validation means 103 for performing input validation to a request from a user based on a predefined security rule set; and determining means 104 for determining a class of violator users, "a first class of users" tending to be determined as innocent users or "a second class of users" tending to be determined as malicious users.

In the protection means 10, alternatively, the deployment means 101 inserts a Javascript component into an application response page by rewriting the application response page and deploys a pre-validation component 110 at the client browser 11. The update means 102 sends or updates a security policy file to the pre-validation component 110 in the client browser 11 periodically or irregularly, wherein a security rule subset contained in the security policy file is screened from the overall security rule set in the protection means 10 according to statistics of violation logs detected by the protection means 10.

The pre-validation component 110 is run in the client browser 11, obtains the security policy file from the server-side protection means 10 and validates a user input field based on a security rule in the security policy file, so as to ensure that a user input will not violate the current security rule subset. The client browser 11 sends the user's HTTP request to the Web application server 13.

The validation means 103 in the protection means 10 validates all user input values in the HTTP request from the user based on the predefined security policy set. Upon detection of violation, the determining means 104 judges whether the violated security rule has been updated to the pre-validation component 110 in the client browser 11. If the violated security rule has not been updated to the pre-validation component 110 in the client browser 11, the determining means 104 then determines the user as one of "a first class of users." If the violated security rule has been updated to the pre-validation component 110 in the client browser, the determining means 104 then determines the user as one of "a second class of users." The protection means may be configured to take different security protection actions to the determined first class of users and second class of users. For example, a security protection action that helps to maintain users' good experience is taken to the determined first class of users, such as, rewriting the request (Rewrite Request); a security protection action that compulsorily blocks all sequent requests is taken to the determined second class of users, such as blocking IP.

According to the security validation scheme of the present invention, the protection means on the Web application server side deploys a pre-validation component to the client and provides pre-validation security rules to the pre-validation component and, preferably, dynamically updates the pre-validation security rules. Hence, upon detection of a violation user input value, the protection means may determine, by deciding whether the violated rule has been validated by the client-side pre-validation component, whether the user is one of "a second class of users," i.e., the user directly sends malicious logic code to the Web application server after bypassing the client-side pre-validation mechanism by some illegal means. Apparently, it is possible to effectively differentiate between "a second class of users" and "a first class of users" according to the technical solution of the present invention, so that the protection means may be configured to take different solutions to different users, i.e., performing different security protection actions. According to an embodiment of the present invention, it is possible to ensure use experience of Web application for "a first class of users" as much as possible and avoid meaningless system performance consumption to a maximum extent. In addition, part of the validation process may be performed on the client side by arranging a pre-validation mechanism on the client side, which helps to reduce the workload for the server-side protection means and enhance performance of the entire validation system accordingly.

As readily appreciated by those skilled in the art from the foregoing description of concrete embodiments, the foregoing method, apparatus and corresponding system may be implemented using computer executable instructions and/or control code comprised in a processor. For example, such code is provided on a carrier medium like a magnetic disk, CD or DVD-ROM, a programmable memory such as a read-only memory (firmware), or a data carrier such as an optical or electronic signal carrier. The means and units in the embodiments of the present invention may be implemented by a hardware circuit such as a VLSI or gate array, semiconductor like a logic chip and a transistor, or a programmable hardware device like a field programmable gate array and a programmable logic device, or by software executed by various types of processors, or by a combination of the hardware circuit and software.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention, the practical application, and to enable others of ordinary skill in the art to understand that all modifications and alterations made without departing from the scope of the present invention.

The invention claimed is:

1. A computer-implemented method for security validation of a user input in a computer network application, the method comprising:
    providing a subset of security rules of a server-side protection means to a pre-validation component deployed at a client side, so as to enable security validation of a user input on the client side by the pre-validation component based on the provided security rule subset;
    validating the user input based on at least one of the security rules of the server-side protection means;
    determining, in response to detecting a user input violation and that a violated security rule has not been provided to the pre-validation component, the user as one of a first class of users;
    determining, in response to detecting the user input violation and that the violated security rule has been provided to the pre-validation component, the user as one of a second class of users;
    performing different security protection actions to the determined first class of users and the determined second class of users, wherein the step of performing different security protection actions to the determined first class of users and the determined second class of users comprises:
        performing, to the second class of users, a security protection action as compulsorily blocking all subsequent requests, and
        performing, to the first class of users, a security protection action which maintains access to the computer network application;
    asynchronously performing a dynamic update to the security rule subset provided to the pre-validation component;
    wherein the security rule subset is screened from the security rules of the server-side protection means in the step of providing the subset of the security rules of the server-side protection means to the pre-validation component and in the step of asynchronously performing the dynamic update to the security rule subset provided to the pre-validation component; and
    wherein a policy for screening the security rule subset is selected from the group consisting of:
        selecting a security rule having a high violation ratio;
        excluding all negative rules in the security rules; and
        excluding high-risk security rules in the security rule.

2. A method as claimed in claim 1, further comprising detecting an onPropertyChange event in an input field, and the pre-validation component validating the user input on the client side based on the provided security rule subset.

3. An apparatus for security validation of a user input in a computer network application comprising: one or more computer processors; one or more computer-readable storage device;
    program instructions stored on the one or more computer-readable storage device for execution by at least one of the one or more computer processors, the program instructions comprising program instructions to: provide a subset of security rules of a server-side protection element to a pre-validation component deployed at a client side, so as to enable security validation of a user input on the client side by the pre-validation component based on the provided security rule subset; validate the user input based on at least one of the security rules of the server-side protection element; determine, in response to detecting a violation user input violation and that a violated security rule has not been provided to the pre-validation component, the user as one of a first class of users;
    determine, in response to detecting the user input violation and that the violated security rule has been provided to the pre-validation component, the user as one of a second class of users; perform different security protection actions to the determined first class of users and the determined second class of users, wherein the computer instructions to perform different security protection actions to the determined first class of users and the determined second class of users comprises computer instructions to:
    perform, to the second class of users, a security protection action as compulsorily blocking all subsequent requests; perform, to the first class of users, a security protection action, which maintains access to the computer network application; asynchronously perform a dynamic update to the security rule subset provided to the pre-validation component;
    wherein (i) the computer instructions to provide the subset of the security rules of the server-side protection element to the pre-validation component degloved at the client side, so as to enable security validation of a user input on the client side by the pre-validation component based on the provided security rule subset and (ii) the computer instructions to asynchronously perform the dynamic update to the security rule subset provided to the pre-validation component, further include computer instructions to screen the security rule subset from the security rules of the server-side protection means according to a policy; wherein the policy is selected from the group consisting of:
    computer instructions to select a security rule having a high violation ratio;
    computer instructions to exclude all negative rules in the security rules;
    and computer instructions to exclude high-risk security rules in the security rule.

4. An apparatus as claimed in claim 3, further comprising computer instructions to detect an onPropertyChange event in an input field, and the pre-validation component validating the user input on the client side based on the provided security rule subset.

5. An article of manufacture tangibly embodying non-transitory computer readable instructions which, when implemented, cause a computer to execute computer instructions comprising computer instructions to: provide a subset of security rules of a server-side protection element to a pre-validation component deployed at a client side, so as to enable security validation of a user input on the client side by the pre-validation component based on the provided security rule subset;

validate the user input based on at least one of the security rules of the server-side protection element;

determine, in response to detecting a violation user input violation and that a violated security rule has not been provided to the pre-validation component, the user as one of a first class of users;

determine, in response to detecting the user input violation and that the violated security rule has been provided to the pre-validation component, the user as one of a second class of users;

perform different security protection actions to the determined first class of users and the determined second class of users, wherein the computer instructions to perform different security protection actions to the determined first class of users and the determined second class of users comprises computer instructions to: perform, to the second class of users, a security protection action as compulsorily blocking all subsequent requests; perform, to the first class of users, a security protection action, which maintains access to the computer network application; asynchronously perform a dynamic update to the security rule subset provided to the pre-validation component; wherein (i) the computer instructions to provide the subset of the security rules of the server-side protection element to the pre-validation component degloved at the client side, so as to enable security validation of a user input on the client side by the pre-validation component based on the provided security rule subset and (ii) the computer instructions to asynchronously perform the dynamic update to the security rule subset provided to the pre-validation component, further include computer instructions to screen the security rule subset from the security rules of the server-side protection means according to a policy;

wherein the policy is selected from the group consisting of: computer instructions to select a security rule having a high violation ratio;

computer instructions to exclude all negative rules in the security rules;

and computer instructions to exclude high-risk security rules in the security rule.

6. The article of manufacture of claim 5, further comprising computer instructions to detect an onPropertyChange event in an input field, and the pre-validation component validating the user input on the client side based on the provided security rule subset.

\* \* \* \* \*